(12) United States Patent
Gombert et al.

(10) Patent No.: US 7,941,465 B2
(45) Date of Patent: *May 10, 2011

(54) SYSTEM AND METHOD FOR SELECTING A PACKAGE STRUCTURAL DESIGN

(75) Inventors: Barry Glynn Gombert, Rochester, NY (US); John Oliver Walker, Rochester, NY (US); Philip Crane Rose, Sodus, NY (US); Jennifer Colleen Perotti, Pittsford, OK (US)

(73) Assignee: Xerox Corporation, Norwalk, CT (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/121,360

(22) Filed: May 15, 2008

(65) Prior Publication Data

US 2009/0287717 A1    Nov. 19, 2009

(51) Int. Cl.
*G06F 17/30* (2006.01)

(52) U.S. Cl. .......... 707/804; 707/999.006; 707/999.101

(58) Field of Classification Search .............. 706/46, 706/56; 707/601, 804, 999.003, 999.006, 707/999.101; 717/108
See application file for complete search history.

(56) References Cited

U.S. PATENT DOCUMENTS

| | | | |
|---|---|---|---|
| 5,291,583 A * | 3/1994 | Bapat ........................... 717/137 |
| 5,838,574 A | 11/1998 | Olson et al. |
| 6,090,027 A | 7/2000 | Brinkman |
| 6,117,061 A | 9/2000 | Popat et al. |
| 6,689,035 B1 | 2/2004 | Gerber |
| 6,895,549 B1 | 5/2005 | Albright et al. |
| 6,939,063 B2 | 9/2005 | Bussell |
| 7,013,616 B1 | 3/2006 | Powers et al. |
| 7,197,465 B1 | 3/2007 | Hu et al. |
| 7,293,652 B2 | 11/2007 | Learn et al. |
| 2003/0035138 A1 | 2/2003 | Schilling |
| 2005/0005261 A1 * | 1/2005 | Severin ........................ 717/108 |
| 2005/0050052 A1 | 3/2005 | Zimmerman et al. |
| 2006/0080274 A1 * | 4/2006 | Mourad ........................... 707/1 |
| 2007/0041035 A1 | 2/2007 | Sembower et al. |
| 2007/0112460 A1 | 5/2007 | Kiselik |
| 2009/0063381 A1 * | 3/2009 | Chan et al. ..................... 706/47 |

FOREIGN PATENT DOCUMENTS

| | | |
|---|---|---|
| WO | 2005000681 A2 | 1/2005 |
| WO | 2005054983 A2 | 6/2005 |
| WO | 2005122079 A2 | 12/2005 |

OTHER PUBLICATIONS

Liang Lu et al, "Folding Cartons with Fixtures: A Motion Planning Approach", IEEE Transactions on Robotics and Automation, vol. 16, No. 4, Aug. 2000.

* cited by examiner

*Primary Examiner* — Marc R Filipczyk
(74) *Attorney, Agent, or Firm* — Pepper Hamilton LLP

(57) ABSTRACT

A system and method of selecting a package model are disclosed. A data structure of a plurality of package models and one or more attribute relationships may be stored. Each package model may have a plurality of package model attributes including at least a size and a style. Each attribute relationship may include an indication that one or more supplemental attributes are required if a constraint is satisfied. A user input that is descriptive of a desired package capability may be received. Using a semantic reasoner, the user input may be analyzed to determine one or more desired attributes. The data structure may be accessed to automatically determine whether a desired attribute satisfies a constraint for an attribute relationship. The one or more supplemental attributes required by the attribute relationship may be presented.

16 Claims, 5 Drawing Sheets

| 401 | style (x,y) | x has the style y |
|---|---|---|
| 402 | weight (x,y) | y is the weight the base of x can hold securely |
| 403 | aperture (x,y) | x has the style y of aperture |
| 404 | base (x,y) | x has the style y of base |
| 405 | acceptable (x) | package x satisfies the requirements |

FIG. 4

501 — r1 :=> acceptable(X)
502 — r2 : style (X,Y), Y= Carton => acceptable(X)
503 — r3 : aperture (X,Y), Y= Interlock Flap Tuck End => acceptable(X)
504 — r4 : base(X,Y), Y= Interlock Flap Tuck End => acceptable(X)
505 — r5 : weight(X,Y), Y > 3 => acceptable(X)

Precedence:
    r2 > r1
    r3 > r2
    r4 > r3
    r5 > r4

FIG. 5

| ID | CAD | STYLE | APERTURE | BASE | WEIGHT (lbs.) |
|---|---|---|---|---|---|
| D1 | | SLEEVE | OPEN | OPEN | 0 |
| D2 | | BIN | OPEN | SNAP LOCK BASE | 5 |
| D3 | | BIN | OPEN | INTERLOCK FLAP TUCK END | 2 |
| D4 | | CARTON | SIDE LOCK SKILLET | SIDE LOCK SKILLET | 3 |
| D5 | | CARTON | SKILLET | SKILLET | 5 |
| D6 | | CARTON | INTERLOCK FLAP TUCK END | CRASH LOCK BASE | 2 |

FIG. 6 though many methods and materials similar or equivalent to those described herein can be used in the practice or testing of embodiments, the preferred methods, devices, and materials are now described. All publications mentioned herein are incorporated by reference. Nothing herein is to be construed as an admission that the embodiments described herein are not entitled to antedate such disclosure by virtue of prior invention.

SYSTEM AND METHOD FOR SELECTING A PACKAGE STRUCTURAL DESIGN

BACKGROUND

The disclosed embodiments relate generally to methods and systems for selecting a package.

Designing a new package is a time-consuming process requiring in-depth knowledge of packaging material structural properties and structural design software (i.e., computer aided design software). Groups, such as the European Carton Manufacturing Association (ECMA), the European Federation of Corrugated Board Manufacturers (FEFCO), the European Solid Board Organization (ASSCO) and the Paperboard Packaging Council (PPC), have developed standards and guidelines to assist designers and manufacturers in defining structural models. The ECMA created the Code of Folding Carton Styles. The Code of Folding Carton Styles provides a reference model standard for paper cartons. FEFCO and the ASSCO created an international shipping package code (the FEFCO Code) which defines international designs, styles and delivery forms of cartons made from cardboard, millboard and corrugated board. Additionally, the PPC offers a handbook entitled "Ideas and Innovation" that outlines various paperboard packaging styles and provides design details for graphic and structural designers and planners.

While current software incorporates these and other standards, the process can be costly because creating a structural model requires an individual with sufficient domain knowledge to select and complete a design. For example, an individual must have sufficient knowledge in order to select a design that best suits a customer's particular needs, design components that are needed for a particular package model, determine types of material or substrates that should be used for a particular package model and determine how components of a package model interrelate.

SUMMARY

In an embodiment, a method of selecting a package model includes storing a data structure of a plurality of package models and one or more attribute relationships, wherein each package model has a plurality of package model attributes comprising at least a size and a style, wherein each attribute relationship includes an indication that one or more supplemental attributes are required if a constraint is satisfied. It also may include: receiving a user input that is descriptive of a desired package capability; analyzing, using a semantic reasoner, the user input to determine one or more desired attributes; accessing the data structure to automatically determine whether a desired attribute satisfies a constraint for an attribute relationship; and presenting the one or more supplemental attributes required by the attribute relationship.

In an alternate embodiment, a system for selecting a package model, includes a package model database configured to store a data structure of a plurality of package models and one or more attribute relationships, wherein each package model has a plurality of package model attributes comprising at least a size and a style, wherein each attribute relationship includes an indication that one or more supplemental attributes are required if a constraint is satisfied. The system also may include a semantic reasoner configured to receive a user input that is descriptive of a desired package capability, analyze the user input to determine one or more desired attributes, access the data structure to automatically determine whether a desired attribute satisfies a constraint for an attribute relationship, and present the one or more supplemental attributes required by the attribute relationship.

In an alternate embodiment, a method of selecting a package model, includes storing a data structure of a plurality of package models and one or more attribute relationships, wherein each package model has a plurality of package model attributes comprising at least a size and a style, wherein each attribute relationship includes an indication that one or more supplemental attributes are required if a constraint is satisfied. The method also may include receiving a user input that is descriptive of a desired package capability; determining one or more terms from the user input; and for each term, selecting an attribute if the term is one or more of identical to, a synonym of, a hyponym of, a meronym of, and a holonym of the attribute in the semantic knowledge base; accessing the data structure to automatically determine whether the selected attribute satisfies a constraint for an attribute relationship; and presenting the one or more supplemental attributes required by the attribute relationship. It also may include receiving a selection of the one or more supplemental attributes; automatically selecting one or more package models by accessing the data structure, wherein, for each selected package model, each desired attribute and each selected supplemental attribute satisfies the corresponding package model attribute; and presenting the one or more selected package models.

BRIEF DESCRIPTION OF THE DRAWINGS

Aspects, features, benefits and advantages of the embodiments described herein will be apparent with regard to the following description, appended claims, and accompanying drawings where:

FIG. 4 depicts exemplary predicates used to capture requirements from a user input and describe package attributes according to an embodiment.

FIG. 5 depicts exemplary rules to capture a user input according to an embodiment.

FIG. 6 depicts exemplary package models in a package model knowledge base according to an embodiment.

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims the singular forms "a," "an," and "the" include the plural reference unless the context clearly dictates otherwise. Thus, for example, reference to a "package" is a reference to one or more packages and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

A "computing device" refers to a system that processes data to perform one or more functions. A computing device may be any processor-based device such as, for example, a server, a personal computer, a personal digital assistant, a web-enabled phone, a smart terminal, a dumb terminal and/or other electronic device capable of processing data and performing functions.

An "assembly device" is a device or machine used in an assembly line that performs a service. For example, an assembly device may be used in a package construction process. In a package construction process, an assembly device may perform package construction services such as, but not limited to, printing, scanning, faxing, folding, sealing, creasing and/or perforating.

A "knowledge base" refers to a repository of searchable data. A knowledge base may include a software component, such as, but not limited to, a database and/or a table. Alternatively, a knowledge base may include a hardware component, such as, but not limited to, a tangible storage medium. As discussed below, a "package model knowledge base" and a "semantic knowledge base" are specific embodiments of a knowledge base. A package model knowledge base includes one or more package models. A semantic knowledge base includes data in the form of an ontology.

A "semantic reasoner" is a system including one or more computing devices in operable communication with a semantic knowledge base.

A "package model" is a parametric design template for a package.

Figure 1:
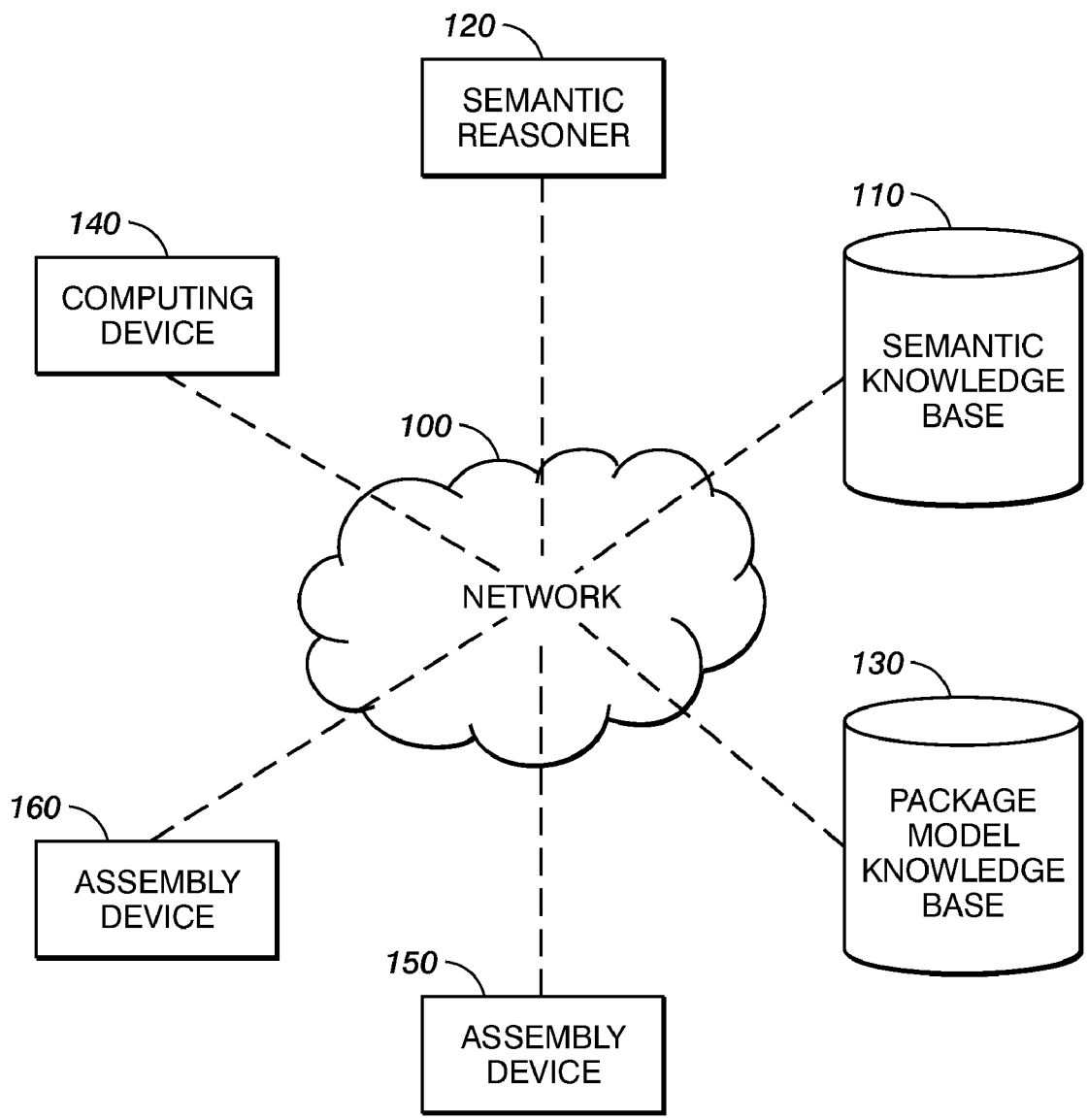
FIG. 1 illustrates a block diagram of an exemplary system for selecting a package according to an embodiment.

FIG. 1 illustrates a system for selecting a package according to an embodiment. As shown in FIG. 1, the system may include a network 100, a semantic knowledge base 110, a semantic reasoner 120, a package model knowledge base 130, a computing device 140, and one or more assembly devices 150, 160. A network 100 may include, but is not limited to, a local area network (LAN), a wide area network (WAN), the Internet, a universal serial bus (USB) network, a Bluetooth network and/or any other communications network.

The semantic knowledge base 110 may include data in the form of an ontology, such as the web ontology language (OWL), which is released by the World Wide Web Consortium, or another format that allows for the description of classes, attributes, individuals and associated relationships between various structural design constructs. A structural design construct defines individuals of a class and provides attribute/value pairs for individuals and restrictions for certain classes. A class may be used to represent a group or set of individual objects with similar characteristics. Package design elements for folding cartons, such as panels, flaps and tabs, are examples of potential classes. Attributes may be used to associate individuals or design elements. For example, an attribute such as "hasPanel" might link an individual "Panel" to an individual "Sleeve." In an embodiment, individuals of a class may provide representations of physical and/or virtual aspects of a structural design.

Semantic relationships may include, but are not limited to, synonyms, antonyms, hyponyms, meronyms and holonyms. Synonyms are two or more words or phrases that are similar or have the same meaning. Antonyms are two or more words or phrases that have an opposite meaning. Hyponyms are two or more words or phrases that describe a specialization or generalization relationship. In an embodiment, hyponyms may be used to define a taxonomical hierarchy of classes. Meronyms are two or more words or phrases that capture the concept of aggregation and/or composition by defining part of a relationship by relating parts to a whole. Holonyms are two or more words or phrases that are parts of, or members of, a whole.

The semantic reasoner 120 may instruct the computing device 140 to provide one or more package models. The one or more package models may be provided by comparing a user input to attributes stored in the semantic knowledge base 110.

The package model knowledge base 130, the semantic knowledge base 110 and the computing device 140 may communicate via a network 100. In an embodiment, the package model knowledge base 130 and the semantic knowledge base 110 may be distributed across a plurality of devices including, but not limited to, the computing device 140 and/or the one or more assembly devices 150, 160.

If the package model knowledge base 130 or a portion thereof is contained within the one or more assembly devices 150, 160 and/or the computing device 140, the package model knowledge base 130 may directly communicate with the computing device 140 and/or the assembly devices 150, 160 instead of via the network 100. Similarly, if the semantic knowledge base 110, or a portion thereof, is contained within the one or more assembly devices 150, 160 and/or the computing device 140, the semantic knowledge base 110 may directly communicate with the computing device 140 and/or the assembly devices 150, 160 instead of via the network 100.

Figure 2:
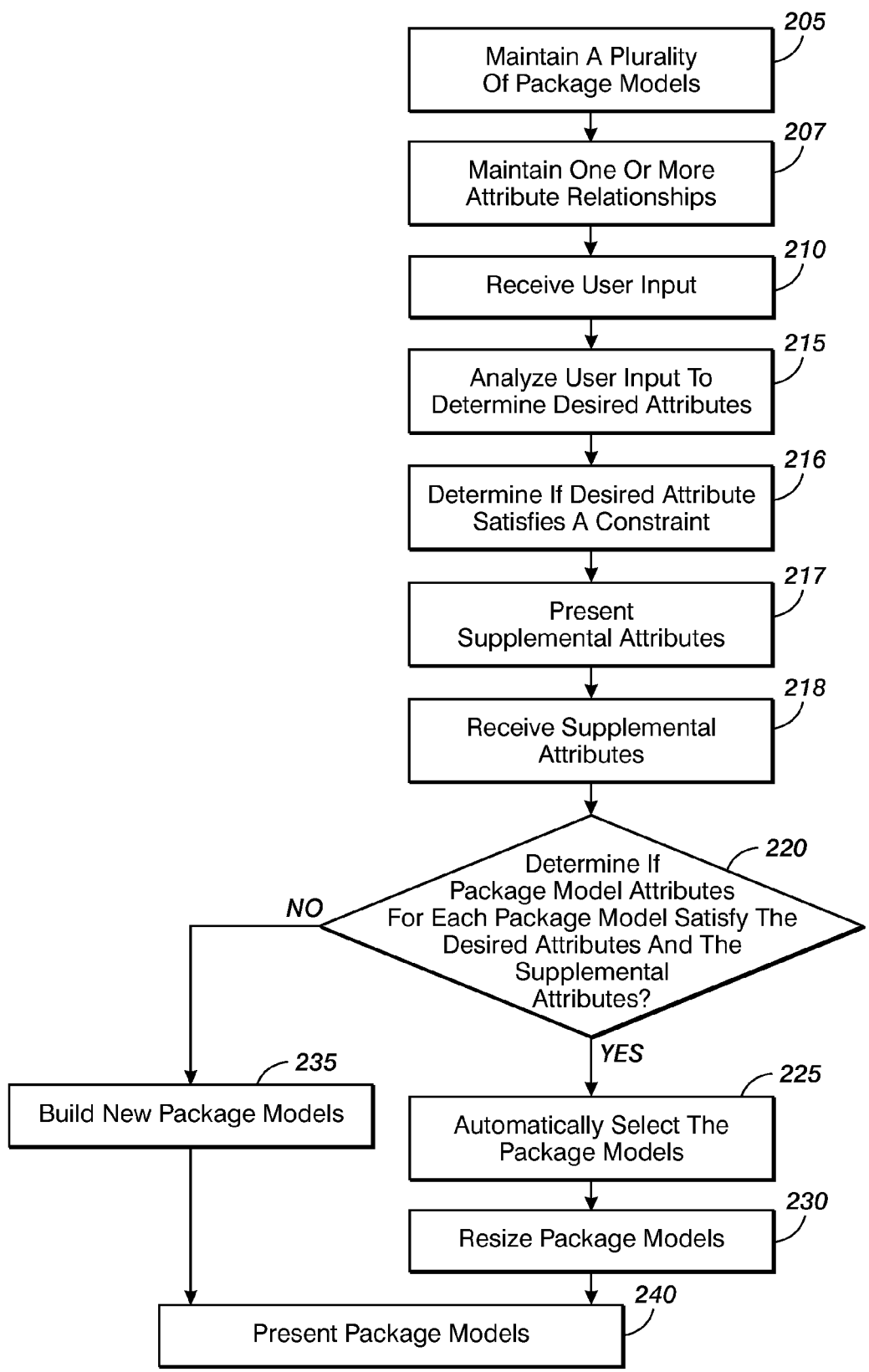
FIG. 2 depicts a flowchart of an exemplary method of selecting a package according to an embodiment.

FIG. 2 depicts a flowchart of an exemplary method of selecting a package according to an embodiment. A data structure may be stored 205 for a plurality of package models. Each package model may have a plurality of package model attributes. The plurality of package model attributes may include at least a size and a style. The package model attributes may also include, but are not limited to, a weight, a fragility, a shape, an attribute of an individual design component, a relationship between package design components, an intended usage, a lifespan, and one or more environmental conditions, such as whether a package is waterproof, whether a package has UV protection, and/or whether a package is recyclable, and/or other information about a package model.

In an embodiment, one or more attribute relationships may also be maintained 207 in the data structure. Each attribute relationship may include an indication that one or more supplemental attributes are required if a constraint is satisfied. In an embodiment, a constraint may include a specific attribute. For example, the specific attribute may be a package model designed to contain a fragile item. The supplemental attribute may be the inclusion of bubble wrap in the packaging. In such a situation, if a package model is designed to contain a fragile item, then bubble wrap may be included in the packaging.

In an embodiment, a constraint may include a plurality of values for an attribute. For example, the plurality of values may be a plurality of weights exceeding a certain weight. The supplemental attribute may include adding additional support to the packaging. Additional support may include, but is not limited to, an additional bracket, extra tape and/or a side support. In such a situation, if a weight is greater than 5 pounds, extra tape may be added.

In an embodiment, a constraint may include a plurality of attributes. For example, the plurality of attributes may be a package model that is square shaped and a package model is 5 inches long. The supplemental attribute may be adding a tab to the package. In such a situation, if the package model is square shaped and 5 inches long, a tab may be added to the package.

Referring back to FIG. 2, a user input may be received 210. In an embodiment, the user input may be descriptive of a desired package capability. For example, a user input may state the following requirements for a rectangular paper carton: 1) the internal dimensions must be 6" high by 4" wide by 2" deep; 2) the bottom of the carton must support 3 pounds when the carton is held upright; 3) the lid of the carton must open and close; and 4) the carton must provide a tuck with locking flaps.

Using a semantic reasoner, the user input may be analyzed 215 to determine one or more desired attributes. The semantic reasoner may translate the user input into attributes associated with the package models. The semantic reasoner may analyze the user input by comparing the user input to attributes in the semantic knowledge base.

Figure 3:
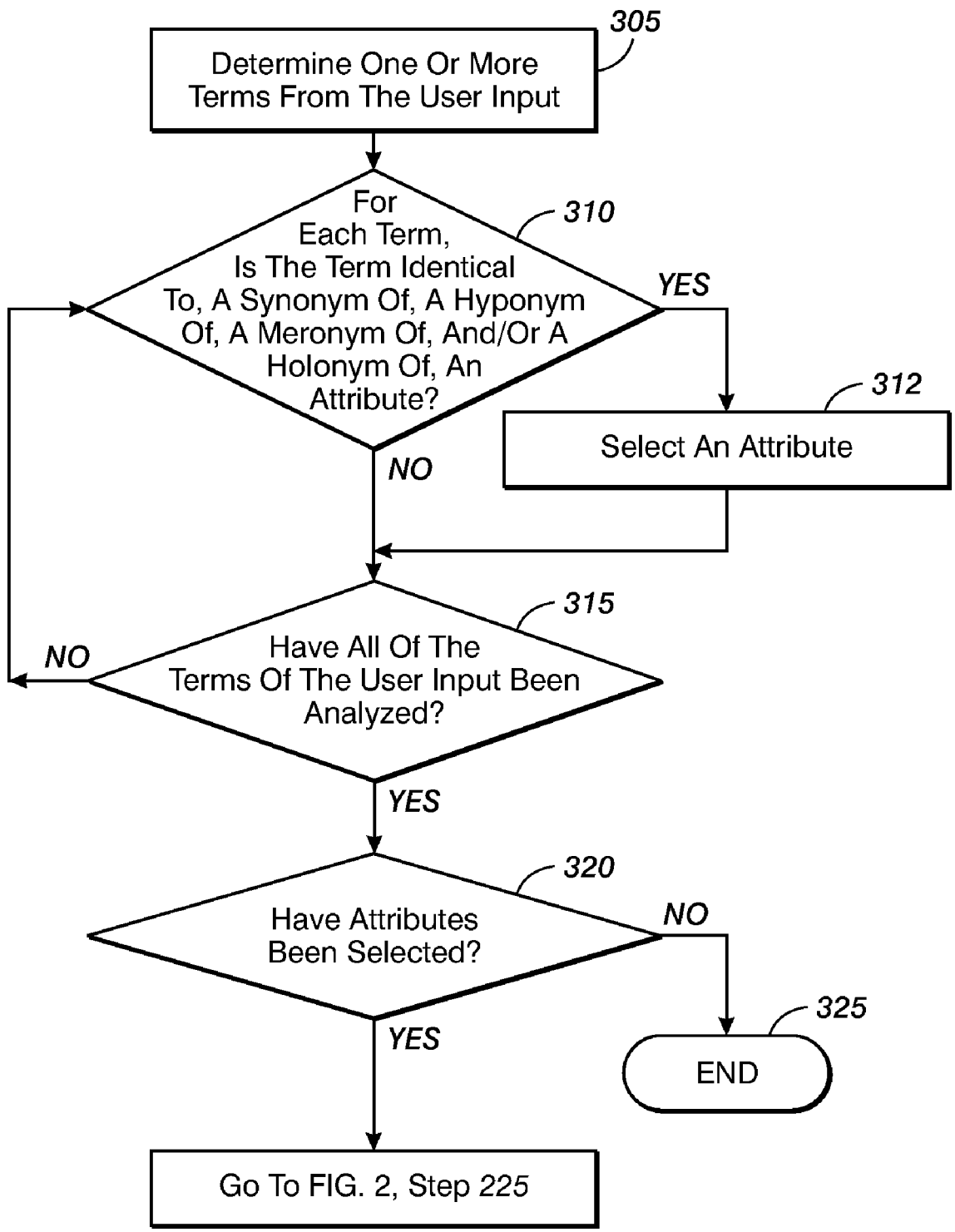
FIG. 3 depicts a flowchart of an exemplary method of analyzing user input according to an embodiment.

FIG. 3 depicts a flowchart of an exemplary method of analyzing user input according to an embodiment. The semantic reasoner may determine 305 one or more terms from the user input. A term may be a word or phrase that is part of the user input.

The semantic reasoner may determine 310 whether a term is identical to, a synonym of, a hyponym of, a meronym of and/or a holonym of an attribute in the semantic knowledge base. If so, the attribute may be selected 312. If at least one term has not been analyzed 315, the process may return to 310. Otherwise, the semantic analyzer may determine if one or more attributes were selected 320. If no attributes were selected 320, the semantic analyzer may terminate 325 its analysis because no attributes match the user input. If one or more attributes were selected 320, then the semantic analyzer may compare the selected attributes with the package model attributes (see FIG. 2).

FIG. 4 depicts exemplary predicates used to capture requirements from a user input and describe package attributes according to an embodiment. In FIG. 4, predicates may be used to show that package model X has a style Y 401, that the weight is a certain amount 402, and that the aperture 403 and base 404 each have a certain style. Additionally, a predicate may show that package X satisfies the requirements 405.

FIG. 5 depicts exemplary rules to capture a user input according to an embodiment. As depicted in FIG. 5, rule R1 501 states that all designs may be considered acceptable. Rule R2 502 states that the style for the carton may be acceptable. Rule R3 503 states that the aperture may include an interlock flap tuck end, and rule R4 504 states that the base may include an interlock flap tuck end. Rule R5 505 states that the weight may be greater than 3 pounds. Finally, the precedence of each rule may be determined.

Referring back to FIG. 2, in an embodiment, the data structure may be accessed to automatically determine 216 whether a desired attribute satisfies a constraint for an attribute relationship. For example, if the user input includes desired attributes A, B and C, supplemental attributes G and H1 or H2 may be required. Using the attribute relationships in the data structure, attribute G may be required because desired attribute A may satisfy a first constraint. Attribute H1 or H2 may be required because desired attribute C may satisfy a second constraint.

For example, attribute A may indicate that the package is waterproof. The constraint for an attribute relationship may state that any waterproof package requires a waterproof spray to be applied to the package. Thus, supplemental attribute G may indicate that a waterproof spray must be added to the package. Alternatively, attribute C may indicate that the package weighs 47 pounds. A constraint in the attribute relationship may state that any package weighing over 40 pounds must be sealed using glue or tape. Supplemental attribute H1 may be glue, and supplemental attribute H2 may be tape.

In an embodiment, the one or more supplemental attributes required by the attribute relationship may be presented 217. In an embodiment, the one or more supplemental attributes may be presented 217 to the user to inform the user that supplemental attributes were selected by the semantic reasoner. In an embodiment, the one or more supplemental attributes may be presented 217 to the user for selection for use in the package construction process. For example, a user may approve or select the waterproof spray to be included as an attribute in the package model. In another example, a user may choose whether glue or tape will be included in the package model. Alternatively, the user may choose both glue and tape to allow the system to choose package models with either glue or tape.

The one or more supplemental attributes may be received 218 by the computing device or the semantic reasoner. The system may determine if the package model attributes for each package model satisfy 220 the one or more desired attributes and the one or more supplemental attributes. If one or more package models with package model attributes satisfy the one or more desired attributes and the one or more supplemental attributes, the one or more package models may be automatically selected 225 by accessing the data structure. For each selected package model, each desired attribute and supplemental attribute may satisfy the corresponding package model attribute.

FIG. 6 depicts exemplary package models in a package model knowledge base according to an embodiment. The package models each may include a unique identifier as well as associated attributes and facets. Based on the desired attributes and the supplemental attributes, the package model with a unique identifier, such as D6 605, may be chosen from the package model knowledge base.

Referring back to FIG. 2, after the one or more package models are automatically selected 225, size adjustments 230 may be made to the one or more package models in order to match at least a portion of the user input. If no package model includes package model attributes that satisfy the one or more desired attributes and the one or more supplemental attributes 220, the semantic reasoner may use the semantic knowledge base to design 235 one or more package models based on the attributes and the relationships of the components in the semantic knowledge base. The one or more designed package models may then be stored in the package model knowledge base for future use.

The one or more package models may be presented 240 for user selection. In an embodiment, the package models may be presented 240 using a display. In an embodiment, the package models may be displayed to a user for use in the package construction process. In an embodiment, the package models may be presented 240 via mail, e-mail or facsimile.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A method of selecting a package model, comprising:
storing, at a package model database, a data structure of a plurality of package models and one or more attribute relationships, wherein each package model has a plurality of package model attributes comprising at least a size and a style, wherein each attribute relationship includes an indication that one or more supplemental attributes are required if a constraint is satisfied;

receiving, at a semantic reasoner, a user input that is descriptive of a desired package capability, wherein the desired package capability comprises requirements for the package model;

analyzing, by the semantic reasoner, the user input to determine one or more desired attributes;

accessing, by the semantic reasoner, the data structure to automatically determine whether a desired attribute satisfies a constraint for an attribute relationship; and presenting, by the semantic reasoner, the one or more supplemental attributes required by the attribute relationship.

2. The method of claim 1, wherein presenting the one or more supplemental attributes comprises displaying to a user the one or more supplemental attributes for selection for use in a package construction process.

3. The method of claim 1, further comprising:
receiving the one or more supplemental attributes;
automatically selecting one or more package models by accessing the data structure, wherein, for each selected package model, each desired attribute and each supplemental attribute satisfies the corresponding package model attribute; and
presenting the one or more selected package models.

4. The method of claim 3, further comprising:
sizing the one or more selected package models based on at least a portion of the user input.

5. The method of claim 3 wherein presenting the one or more selected package models comprises displaying the one or more selected package models to a user for use in a package construction process.

6. The method of claim 1 wherein the package model attributes further comprise one or more of the following:
a weight, a fragility, a shape, an attribute of individual design component, a relationship between package design components, an intended usage, a lifespan, and one or more environmental conditions.

7. The method of claim 1 wherein accessing the data structure comprises accessing the data structure to automatically determine whether a desired attribute matches a specific attribute for the attribute relationship.

8. The method of claim 1 wherein accessing the data structure comprises accessing the data structure to automatically determine whether a desired attribute matches a plurality of attributes for the attribute relationship.

9. The method of claim 1 wherein accessing the data structure comprises accessing the data structure to automatically determine whether a desired attribute matches a plurality of values for an attribute for the attribute relationship.

10. The method of claim 1, further comprising:
determining whether the plurality of package model attributes for each package model satisfy the corresponding one or more desired attributes and the one or more supplemental attributes;
creating one or more package models based on the one or more desired attributes and the one or more supplemental attributes; and
presenting the one or more created package models.

11. The method of claim 1 wherein analyzing the user input to determine one or more desired attributes comprises:
determining one or more terms from the user input; and
for each term, selecting an attribute if the term is one or more of identical to, a synonym of, a hyponym of, a meronym of, and a holonym of the attribute in the semantic knowledge base.

12. A system for selecting a package model, comprising:
a package model database configured to:
store a data structure of a plurality of package models and one or more attribute relationships, wherein each package model has a plurality of package model attributes comprising at least a size and a style, wherein each attribute relationship includes an indication that one or more supplemental attributes are required if a constraint is satisfied; and
a semantic reasoner configured to:
receive a user input that is descriptive of a desired package capability, wherein the desired package capability comprises requirements for the package model,
analyze the user input to determine one or more desired attributes,
access the data structure to automatically determine whether a desired attribute satisfies a constraint for an attribute relationship, and
present the one or more supplemental attributes required by the attribute relationship.

13. The system of claim 12 wherein the semantic reasoner is further configured to:
receive the one or more supplemental attributes;
automatically select one or more package models by accessing the data structure, wherein, for each selected package model, each desired attribute and each supplemental attribute satisfies the corresponding package model attribute; and
present the one or more selected package models.

14. The system of claim 13 wherein the semantic reasoner is further configured to size the one or more selected package models based on at least a portion of the user input.

15. The system of claim 12 wherein the semantic reasoner is further configured to:
determine one or more terms from the user input; and
for each term, select an attribute if the term is one or more of identical to, a synonym of, a hyponym of, a meronym of, and a holonym of the attribute in the semantic knowledge base.

16. A method of selecting a package model, comprising:
storing, at a package model database, a data structure of a plurality of package models and one or more attribute relationships, wherein each package model has a plurality of package model attributes comprising at least a size and a style, wherein each attribute relationship includes an indication that one or more supplemental attributes are required if a constraint is satisfied;
receiving, at a semantic reasoner, a user input that is descriptive of a desired package capability, wherein the desired package capability comprises requirements for the package model;
determining, by the semantic reasoner, one or more terms from the user input;
for each term, selecting, by the semantic reasoner, an attribute if the term is one or more of identical to, a synonym of, a hyponym of, a meronym of, and a holonym of the attribute in the semantic knowledge base;
accessing, by the semantic reasoner, the data structure to automatically determine whether the selected attribute satisfies a constraint for an attribute relationship;
presenting, by the semantic reasoner, the one or more supplemental attributes required by the attribute relationship;

receiving, by the semantic reasoner, a selection of the one or more supplemental attributes;

automatically selecting, by the semantic reasoner, one or more package models by accessing the data structure, wherein, for each selected package model, each desired attribute and each selected supplemental attribute satisfies the corresponding package model attribute; and presenting, by the semantic reasoner, the one or more selected package models.

* * * * *